United States Patent

[11] 3,579,230

| [72] | Inventor | James H. Casterlin |
| | | Binghamton, N.Y. |
| [21] | Appl. No. | 737,714 |
| [22] | Filed | June 17, 1968 |
| [45] | Patented | May 18, 1971 |
| [73] | Assignee | Quantametric Devices, Inc. |
| | | Johnson City, N.Y. |

[54] DIGITAL TRANSDUCER AND MEMORY SYSTEM THEREFOR
6 Claims, 17 Drawing Figs.

[52] U.S. Cl............................................... 340/347
[51] Int. Cl................................................ G08c 9/04
[50] Field of Search................................... 340/347

[56] References Cited
UNITED STATES PATENTS

| 2,888,673 | 5/1959 | Layton | 340/347 |
| 2,922,994 | 1/1960 | Kennedy | 340/347X |
| 2,962,705 | 11/1960 | Relis et al. | 340/347 |
| 3,034,715 | 5/1962 | Wagner | 340/347X |
| 3,070,789 | 12/1962 | Kristy et al. | 340/347 |
| 3,371,336 | 2/1968 | Bennet et al. | 340/347 |

*Primary Examiner*—Maynard R. Wilbur
*Assistant Examiner*—Gary R. Edwards
*Attorney*—Frederick E. Bartholy ABSTRACT: A transducer for indicating the extent of rotation of a shaft in digital units consists of several intergeared rotating circuit closure devices coupled to the shaft, each representing a decade in the numerical system. The closure devices operate, by magnetic attraction, reed switches connected to relay circuits. Each closing and subsequent opening of a circuit connected to the closure devices prepares the eventual actuation of a particular relay designating a digit in each decade. A holding circuit for each relay maintains closure of the relays energized at the time when the rotation of the closure device is momentarily stopped for interrogation of the transducer.

FIG. 1

INVENTOR
JAMES H. CASTERLIN

INVENTOR
JAMES H. CASTERLIN

BY Frederick Bartholz

ATTORNEY

INVENTOR
JAMES H. CASTERLIN

BY Frederick E. Bartholy

ATTORNEY

FIG. 9a

| FIG. 9 a | FIG. 9 b | FIG. 9 c |
| --- | --- | --- |
| FIG. 9 d | FIG. 9 e | FIG. 9 f |
| FIG. 9 g | FIG. 9 h | FIG. 9 i |

DIGITAL TRANSDUCER AND MEMORY SYSTEM THEREFOR

This invention relates to a system and apparatus for indicating or recording, in digital representation, the extent of the angular displacement of a rotating member, such as a shaft, at any desired intervals.

In certain scientific measuring applications, the extent of rotary displacement of a shaft, within a predetermined range, may have a direct bearing on the phenomenon being investigated. The number of revolutions and the angular position at a given time or at various selected times may represent significant values which the observer desires to know or would like to record for future use. In applications of this type, the shaft, or any rotating element of which the excursion is to be indicated, may be coupled to a chart tracing device which will give a graphic representation of the rotational displacement. Such representation, however, is not in directly readable digital numbers and must be computed from the curve traced as to certain positions in a two-coordinate system. While the reading from a chart may be quite accurately computed into decimal and digital numbers, this requires the exercise of human observations and judgment and, as such, is subject to the frailties of the individual observer.

In the present technological pace, it is also necessary to be able to provide data in such form as is generally utilized in data processing machines, namely, in digital numbers. In the above-mentioned example, the reading from a chart would have to be noted by a person and then transferred to a punch card for data processing use.

The present invention eliminates the above-outlined procedure by providing means which require no human judgment or work and enables the automatic digital computation of the tracing drawn on a chart in accordance with the rotational displacement of a shaft to be directly presented in digital units and fed into data processing apparatus.

Accordingly, it is a primary object of this invention to provide an apparatus which, coupled to a shaft, will motivate a series of switching elements which are sequentially actuated in accordance with the extent of rotary displacement of the shaft.

It is a further object of this invention to provide a transducer which converts the rotational displacement of a shaft into electrical current for the actuation of relays representing digital numerical quantities correlated to the extent of rotation of the shaft.

It is a particular feature of the invention that the switching elements of the transducer are of the hermetically sealed reed-type and are actuated by permanent magnets.

It is a particular advantage of the invention that the system of which the apparatus is a part may easily be extended to any desired decades for the digital representation of the rotary displacement of a shaft.

Other objects, features, and advantages will be apparent from the following description of the invention defined, in particularity, in the appended claims and taken in connection with the accompanying drawings in which:

Figure 1:
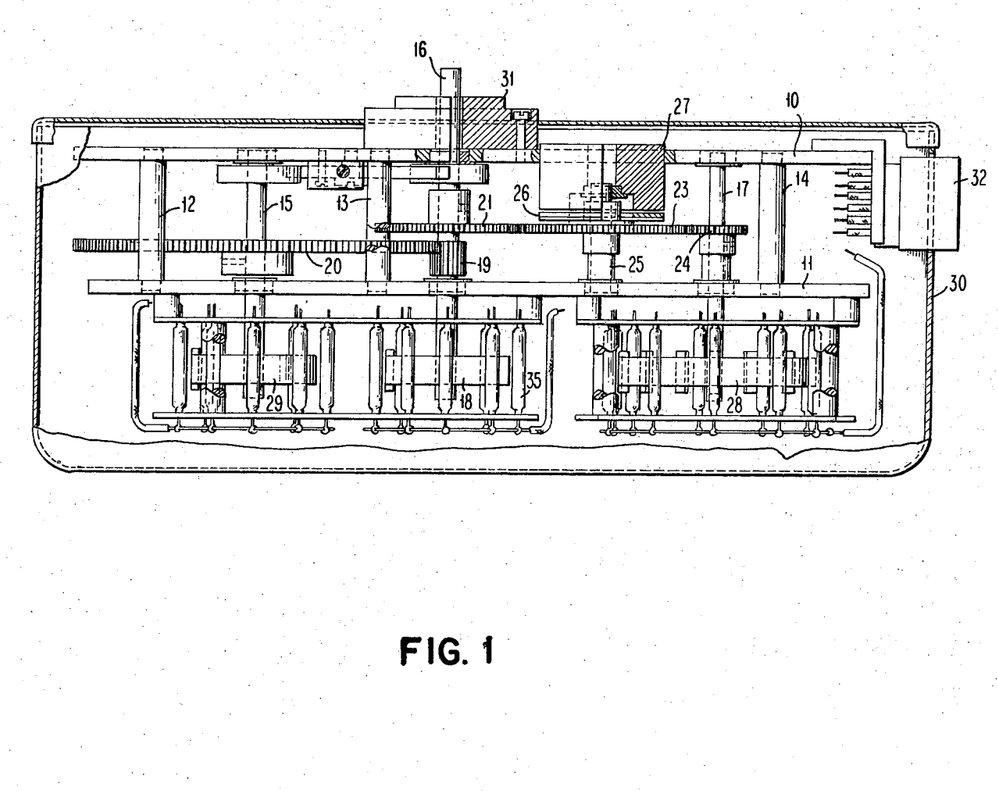
FIG. 1 is a top view, partially in sections, of the digital transducer with portions of the housing cut away.

Referring to the figures, as seen in FIG. 1, the transducer unit consists of parallel frame members 10 and 11 separated by spacers, of which 12, 13 and 14 are shown. The frames 10 and 11 accommodate decade shafts 15, 16 and 17. The shaft 16 is also the input shaft which is to be coupled to a rotating element as, for example, the shaft of a curve tracing unit of which the rotational displacement is to be converted into digital numerals. Directly mounted on shaft 16 is the tens decade rotor 18. The shaft 16, by means of a suitable gear 19 mounted thereon, also drives the gear 20 which is secured to the hundreds shaft 15. Similarly, the shaft 16 drives, by means of gear 21 attached thereto, the idler gear 23 which in turn is coupled to the shaft 17 by means of gear 24. The shaft 25 of the idler gear 23 drives the armature 26 of an electrical brake mechanism 27 which is actuated in a conventional manner when the rotation of all gears is to be stopped. The shaft 17 supports the units rotor 28 and the shaft 15 similarly supports the hundreds rotor 29. A protective cover 30 encloses the entire mechanism. A mounting boss 31 is provided for holding the unit in place and an electrical connector 32 serves as an outlet for the various electrical connections not shown here.

Figure 2:
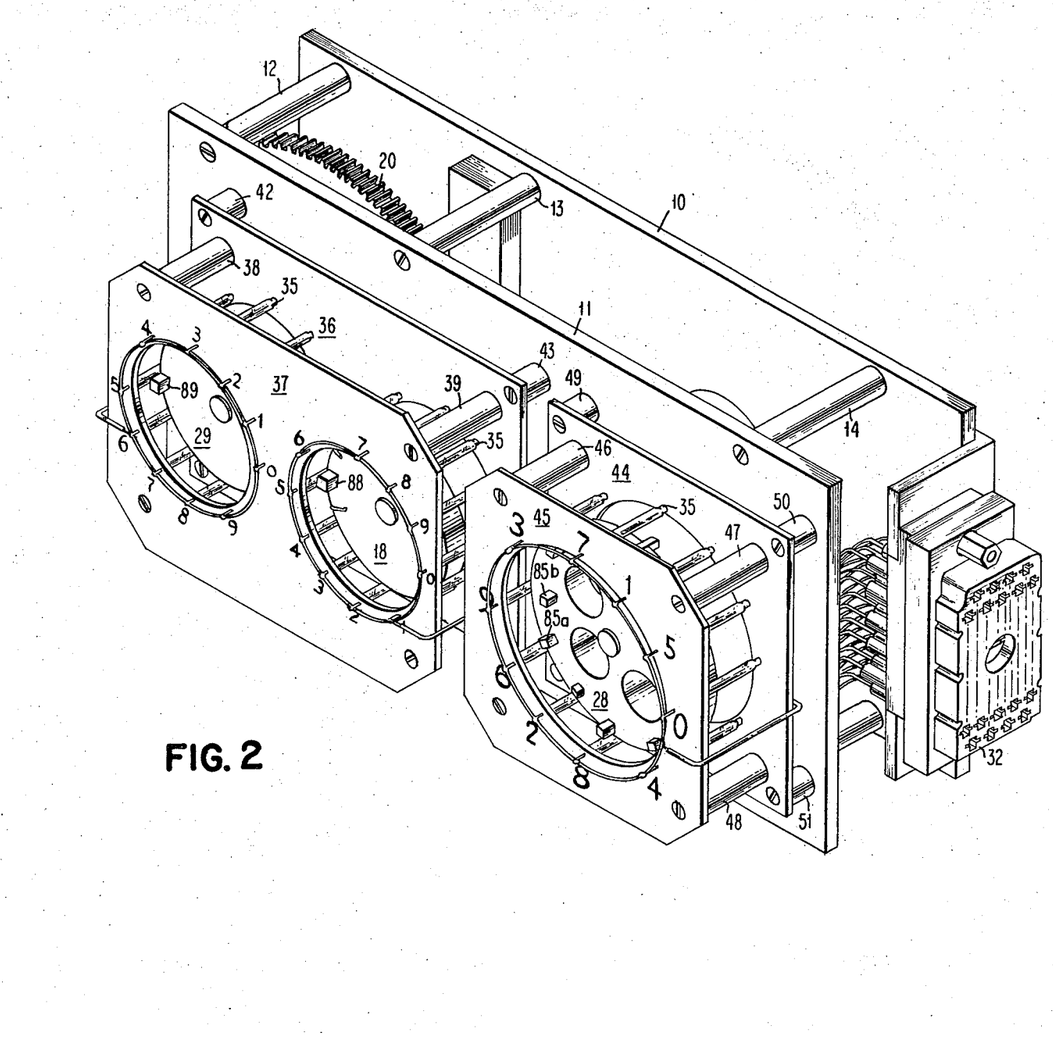
FIG. 2 is an isometric view of the transducer unit illustrating the rotor and switch side thereof.
Figure 7:
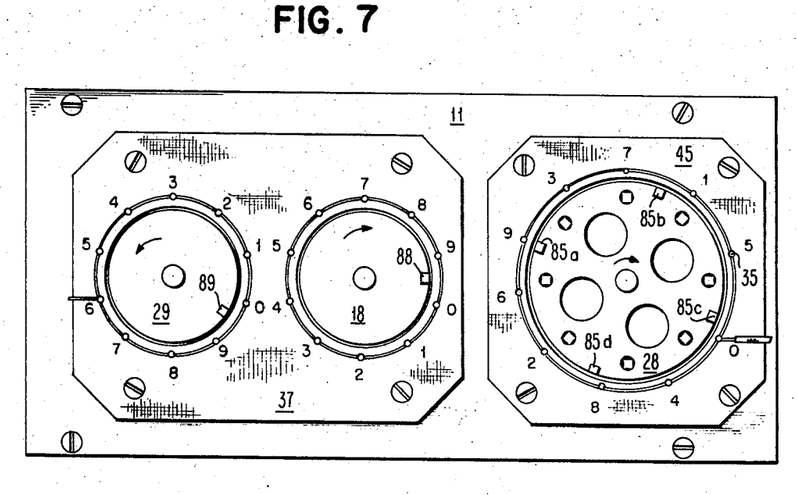
FIG. 7 is a front elevational view of the switch portion of the transducer showing the relative placement of the rotors and associated magnets and the disposition of the reed switches.

Surrounding the rotors 18, 28, and 29, in a cage-type assembly, are reed switches 35. These are all identical and therefore need not be referenced individually except for the positions taken by them which are shown in FIGS. 2 and 7. Suffice it to say that each switch represents a digit in a decade and each rotor assembly represents one decade in the numerical system.

Referring to FIG. 2, the view is taken from the rotor end of the assembly and consists of frames 36 and 37 separated by spacers, of which 38 and 39 are shown, between which are placed the reed switches 35 equally distributed around the rotors 29 and 18, respectively. The frame assembly is attached to the frame 11 of the unit by means of suitable fastening means and separated by spacers of which 42 and 43 are shown here. In a similar manner, frame members 44 and 45, separated by spacers, of which 46, 47, and 48 are seen here, hold the reed switches 35 and the entire assembly is attached to the frame 11 by suitable fasteners and spacers 49, 50, and 51, seen here. The reed switches 35 surround the unit rotor 28, there being 10 switches, each representing one digit of the decade. These are numbered from zero to 9. A similar numbering is affixed to switches 35 surrounding the tens rotor 18 and the hundreds rotor 29.

Figure 3:
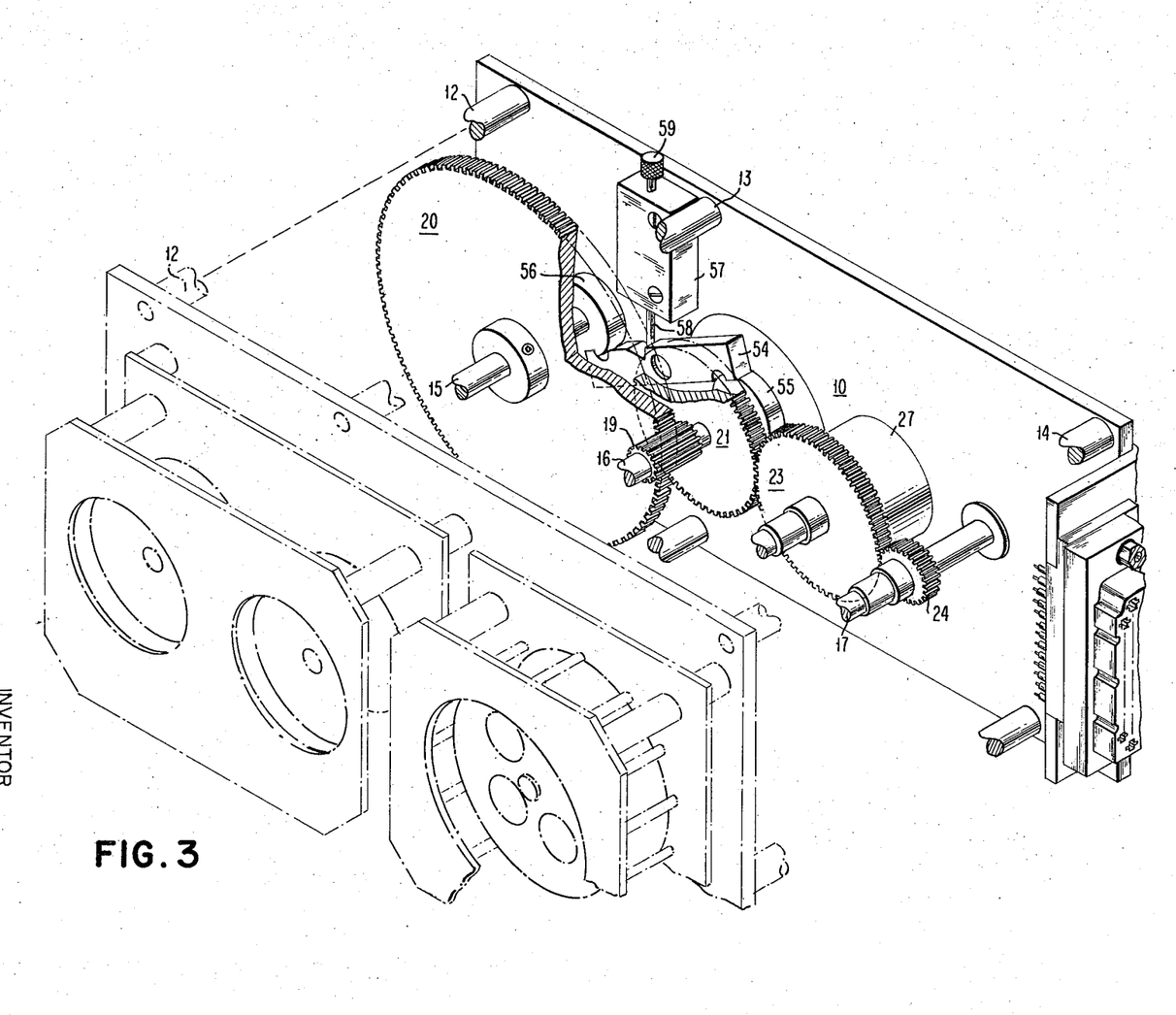
FIG. 3 is an isometric view showing the gear train which interconnects the rotors and the zero position lock mechanism, the other portions of the assembly being outlined.

Referring to FIG. 3, a clearer illustration of the gear train and brake mechanism together with the automatic zero position latching device is shown. The latter comprises the latching member 54 and a disc 55 mounted on the tens rotor shaft 16 and disc 56 mounted on the hundreds rotor shaft 15. The release mechanism for the latching member 54 comprises the block 57 attached to the frame 10 and accommodating the release pin 58 which has a knurled head 59.

Figure 4:
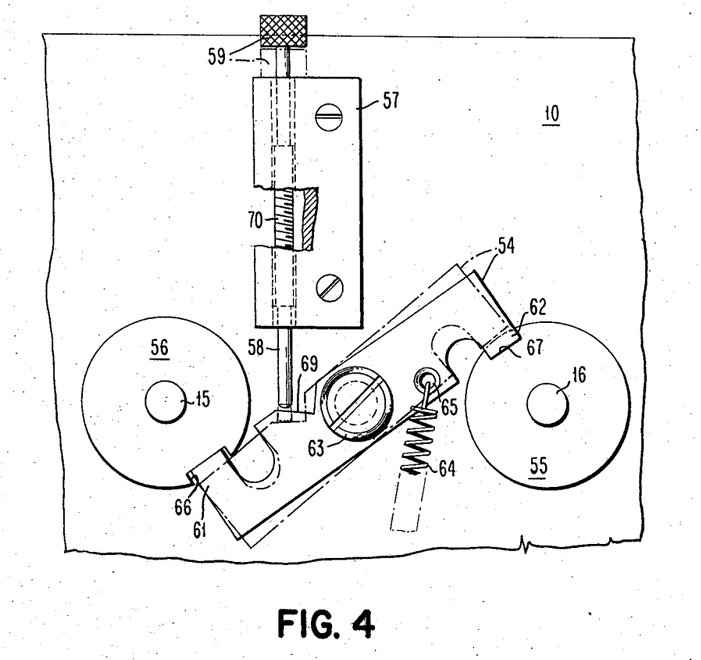
FIG. 4 is a partial view of an assembly, illustrating the automatic zero lock mechanism in locked position and the release thereof.
Figure 6:
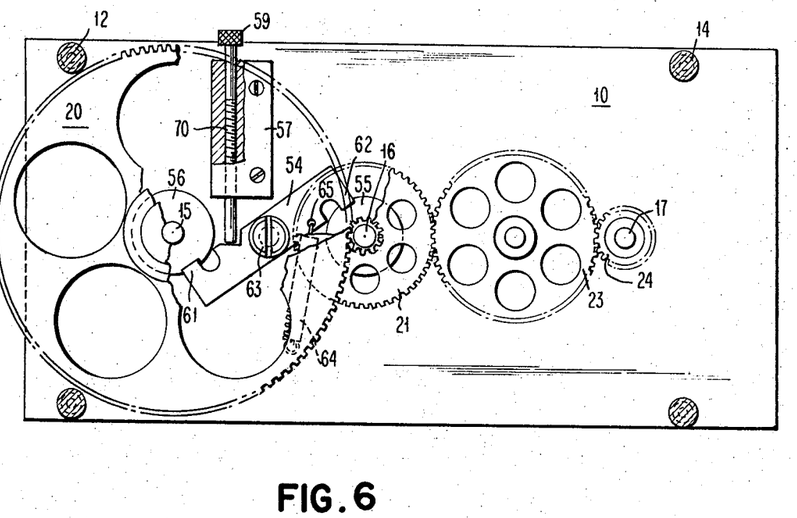
FIG. 6 is a front elevational view of the gear train and zero positioning latch mechanism.

A detailed showing of the zero position latching mechanism is shown in FIGS. 4 and 6. It is seen that the latching member 54 consists of a bar having hook portions 61 and 62 and is pivoted on the stud 63 secured to the frame member 10. Spring 64 is partially shown engaging an eyelet 65 in the latching member 54. The other end of the spring 64 is secured to the frame member at a convenient location, not shown here. In this manner, the bar 54 is urged to rotate clockwise in order to engage the cutouts 66 and 67 of the discs 56 and 55, respectively. The pin 58 adapted to engage the slanted notch 69 of the bar 54 serves to disengage the latter from the cutouts 66 and 67. The pin 58 has a threaded portion 70, as shown in the cutaway portion of the block 57 (FIG. 6), and a knurled head 59 so that, by turning, it can be lowered into a position to cause the bar 54 to pivot counterclockwise over the stud 63 and disengage the hook portions 61 and 62 from the discs 56 and 55, respectively. This position is shown in dotted lines in FIG. 4.

The purpose of the zero positioning latch mechanism will be explained in connection with the operation of the device. Suffice it to say that the disc 56 is of somewhat larger diameter than the disc 55 and that the cutout 66 in the disc 56 is somewhat wider than the similar cutout 67 in the disc 55. The purpose of this is that when the latch bar is released, peripheral contact will be had first between the hook portion 61 and the disc 56, thereby reducing the friction. The disparity between the cutouts is for the purpose of easier engagement of the latching member 54.

Figure 5:
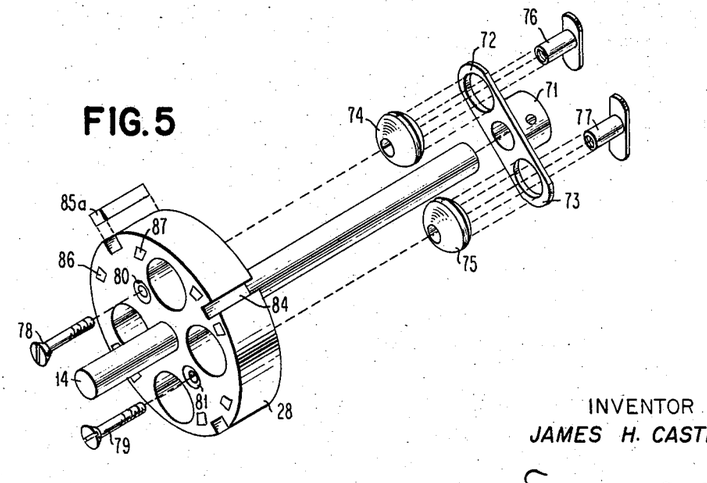
FIG. 5 is an exploded view showing the construction and assembly of the rotor which actuates the unit decade switches, particularly the shock mounting thereof.

Referring to FIG. 5, the unit rotor element is shown here in an exploded view to illustrate the mounting thereof which consists of the drive collar 71, having lateral portions 72 and 73 which accommodate rubber grommets 74 and 75, respectively. Sleeve-type nuts 76 and 77 fit within the grommets 74 and 75, respectively, and are attached to the rotor disc 28 by means of screws 78 and 79 which fit through suitable holes 80 and 81. In this manner, the rotor 28 which rides freely over the shaft 14 is shock mounted. The reason for the shock mounting is that this unit has the fastest rate of revolution compared to the tens rotor 18 and hundreds rotor 29, and prevents undue stress at a time when all rotors are suddenly momentarily stopped for interrogation of the transducer, as will be explained later.

On the periphery of the rotor 28 are four equally spaced slots 84 which accommodate bar magnets 85a, b, c, and d, of which one is shown in this figure. These magnets, when inserted, are flush with the periphery of the rotor 28 and, as seen in FIGS. 2 and 7, pass in close proximity to the reed switches 35 so as to be actuated by the magnetic force thereof. Adjacent each magnet 85, and at a shorter radial distance, are buffer magnets 86 and 87 which are placed in opposite polarity with respect to the actuating magnet 85. The purpose of the buffer magnets is to control the effective field of the actuating magnets. The function of these will also be explained in connection with the mechanical operation of the device. It should be mentioned, however, that while the tens rotor 18 has only one actuating magnet 88 and the hundreds rotor 29 has only one actuating magnet 89, the units rotor has four such magnets inasmuch as it makes 40 counts per single turn of the rotor element 28. To further insure effective switch closure and opening which is entirely due to magnetic attraction, the layout of the switches is so arranged that the switch which is being actuated is located remotely from the switch to be actuated. As seen in FIG. 7, and assuming a clockwise rotation of the rotor 28, the magnet 85a is in a position to actuate the switch 9, whereas the magnet 85c is nearing the switch zero for the next sequential actuation.

As the rotor continues to turn, the magnet 85b, which is now one-half way between the switches 7 and 1, would actuate switch 1 and the next step in the rotor movement would be the actuation of switch 2 by the magnet 85d. An overlap of about three-tenths of a digit is provided to eliminate dead zone. The switch zero will be actuated before the switch 9 drops out. Similarly, switch 1 will be actuated before switch zero drops out, etc. Due to the relatively closer spacing of the rotor magnets, the buffer magnets will insure, by virtue of their opposing polarity, the disengagement of the particular reed switch engaged by the actuating magnets past a certain angular displacement.

Continuing with FIG. 7, the tens rotor 18 has its actuating magnet 88 shown in a position between 9 and zero, at which time both the 9 and 0 switches are closed by virtue of the magnetic field of the magnet 88. Since this rotor also turns in a clockwise direction, number 9 will open first and the number zero will remain closed. At the same time, the hundreds rotor 29 which turns in a counterclockwise direction, has its actuating magnet 89 between positions of switches 9 and zero, whereby both of these are closed. Traveling toward the switch zero, switch 9 will open and zero will remain closed. In fact, in the positions depicted in FIG. 7, numbers 9 and 0 in both the tens and hundreds decades would be closed and in the units decade switches 8 and 9 will be closed. The reason for this is that the actuating magnet 85d, leaving switch 8, is not sufficiently far away for this reed switch to open. Opening will be effected as soon as magnet 85a is in a position radially opposite to the reed switch in the 9 position. As will be understood from the operation of the transducer in connection with the bank of relays providing a memory system, the switch positions are effective only at the time when the transducer is momentarily stopped. Only at that instant are the reed switches supplied with current for relay actuation. By virtue of the fact that no relays are actuated while the transducer is running, it may be operated at a relatively high speed, limited only by mechanical design considerations. In a practical embodiment, the units rotor has a diameter of 1¾ inches and will operate at a speed up to 3000 r.p.m.

Figures 8, 9A:
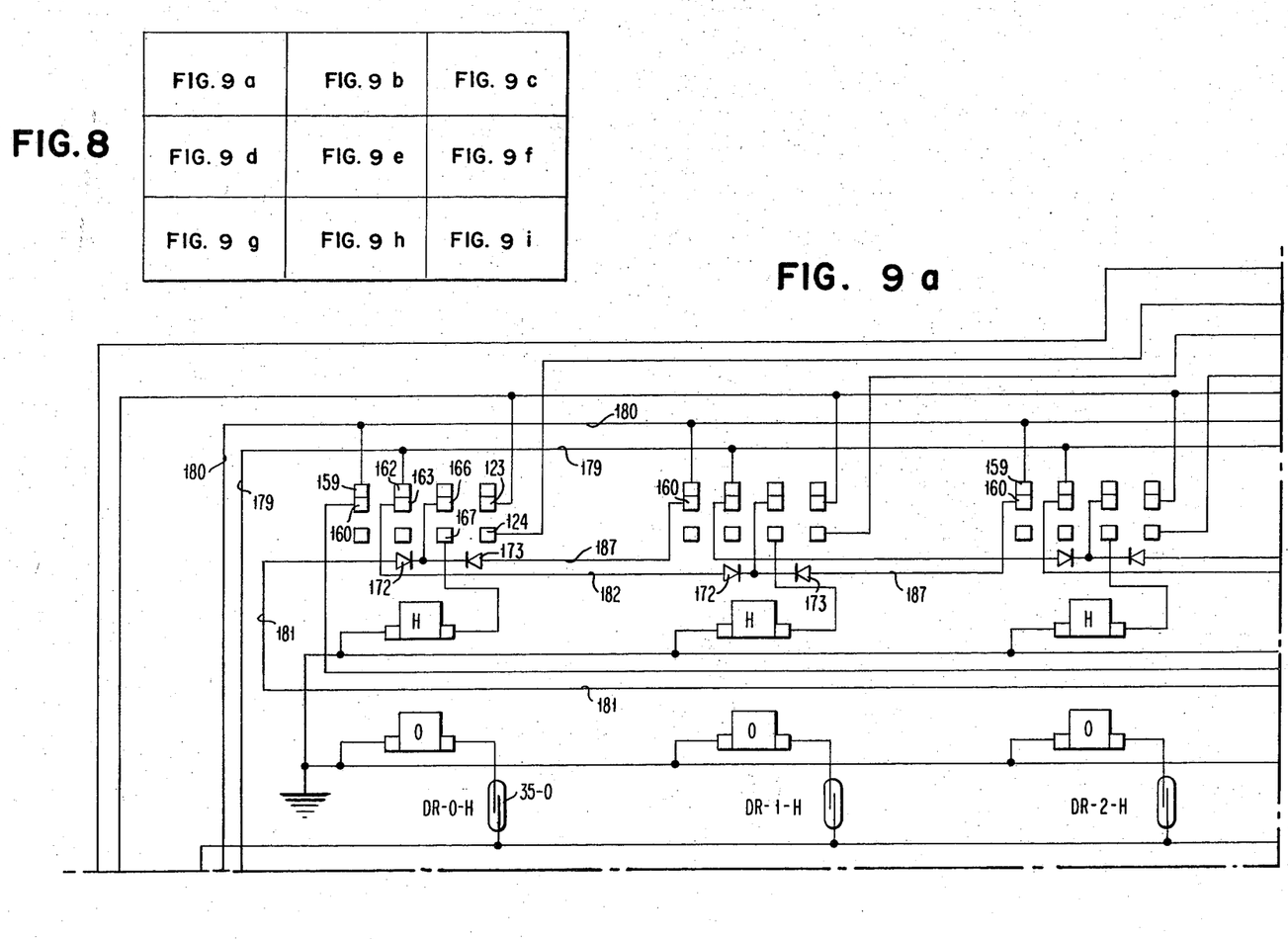
FIG. 8 is a layout showing the placement of interrelated sections of FIG. 9.
FIG. 9a, b, c, d, e, f, g, h, and i, in the order of placement shown in FIG. 8, comprises the schematic electrical circuit diagram of the digital memory system.

Referring to FIG. 9, assembled as indicated in FIG. 8 so that the continuity of the circuit to all parts may be followed, it is seen that there are three banks of relays, each representing a decade in the numerical scale and that there are 10 relays to each bank, each relay being a digit in the numerical scale. The relays are of the multipole type, having normally closed and normally open contacts. Every relay has an operating coil designated by O, and a holding coil designated by H. Whenever distinction is to be made as to which holding or operating coil is to be considered, it will be suffixed with the particular relay number to which it pertains. The moving contacts of a relay will be designated as the "rider" placed between an upper set of contacts which it normally engages and a lower set of contacts which are normally open. The contacts will be referred to in order of their placement, as the first, second, etc., of the rider or of the upper or lower set. Certain of these will also have numerical reference characters if needed for a clearer understanding of the circuit.

Figure 9B:
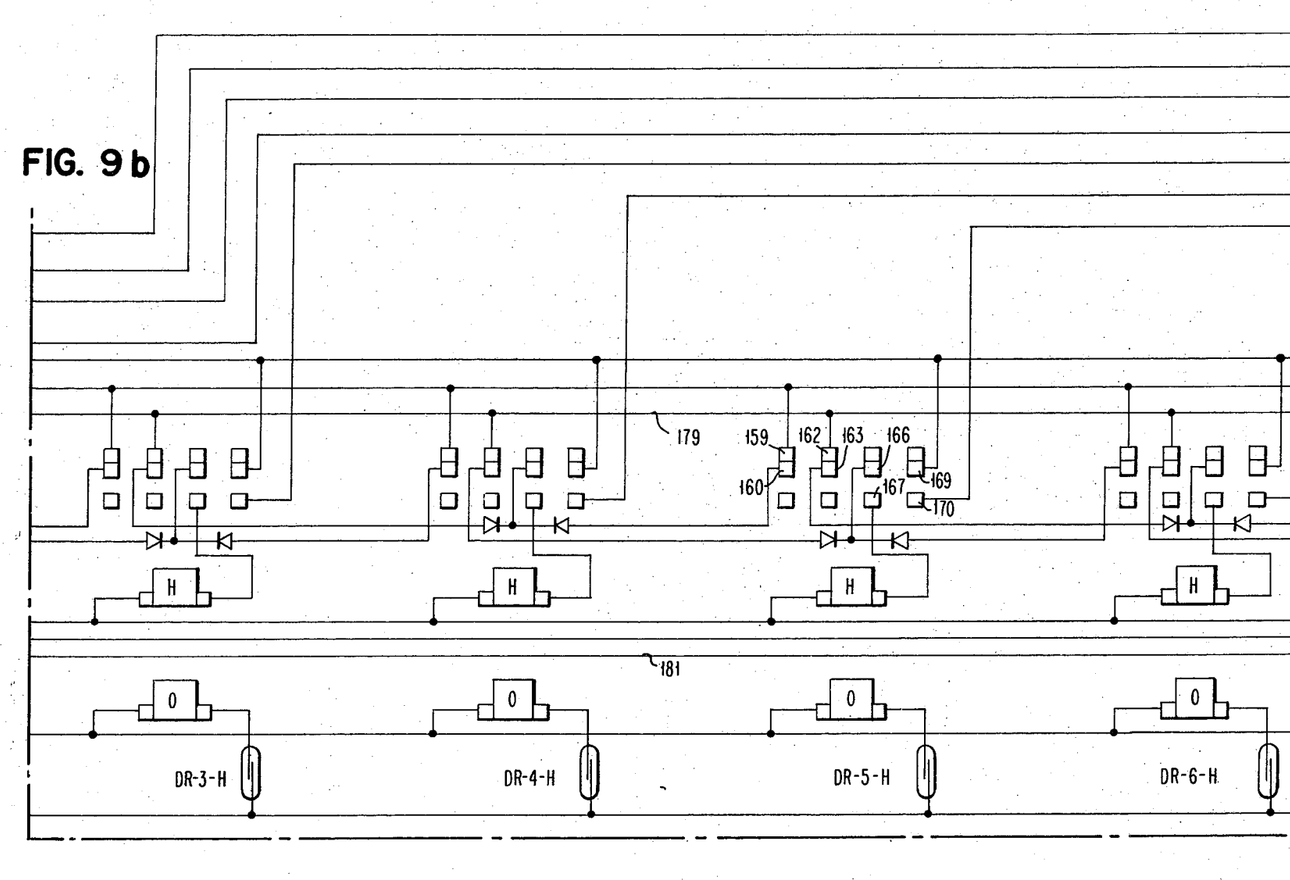
Figure 9C:
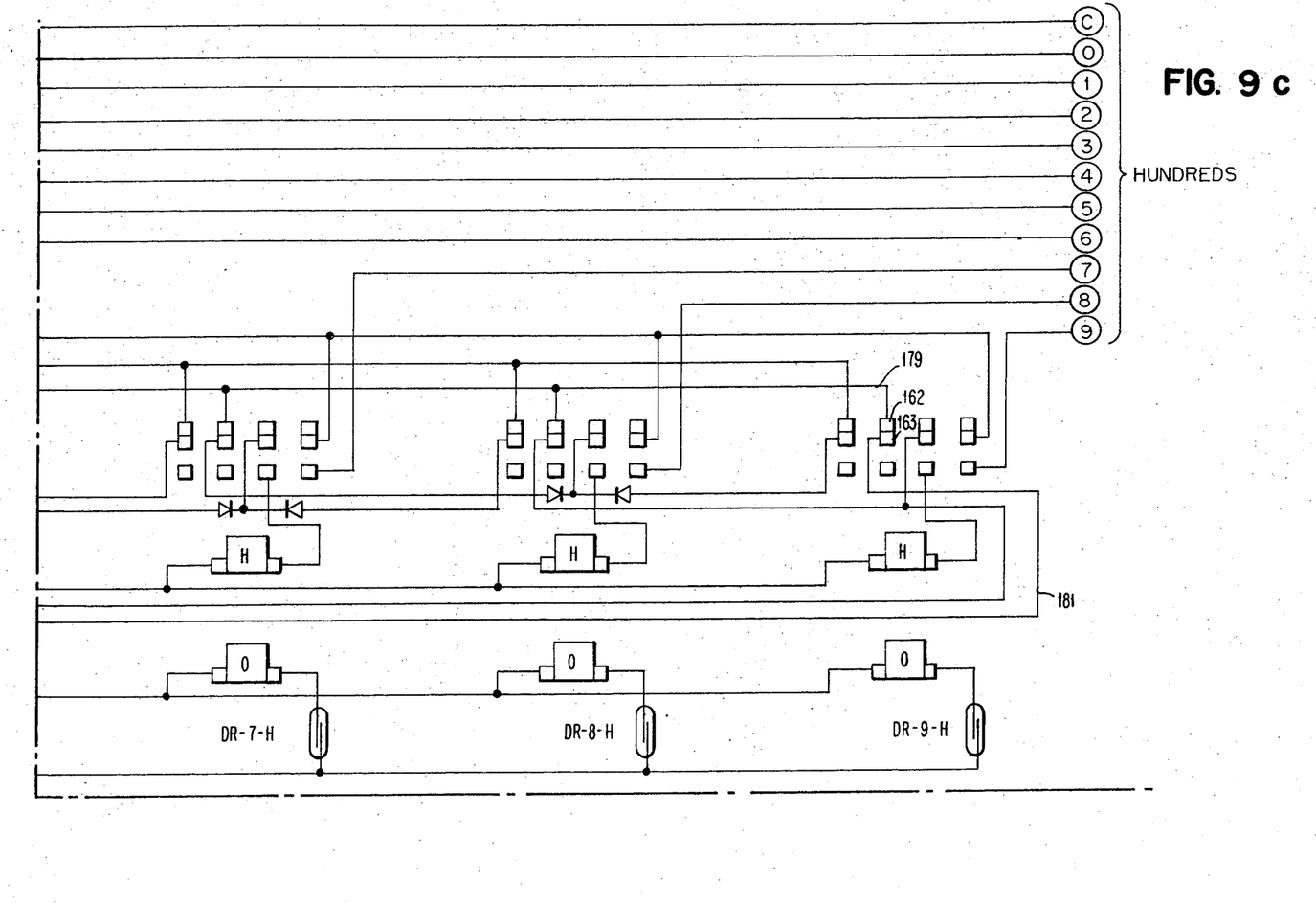
Figure 9D:
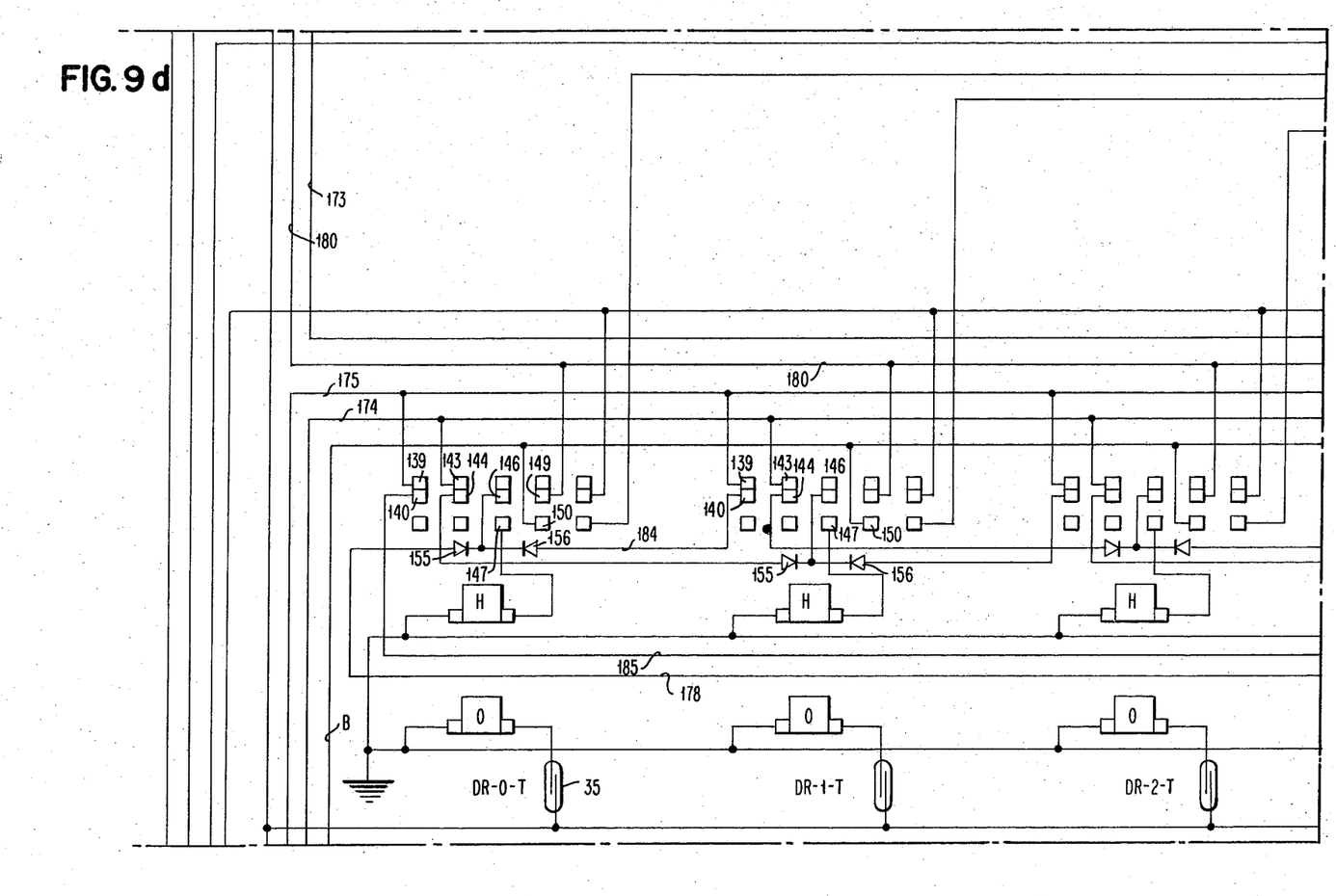
Figure 9E:
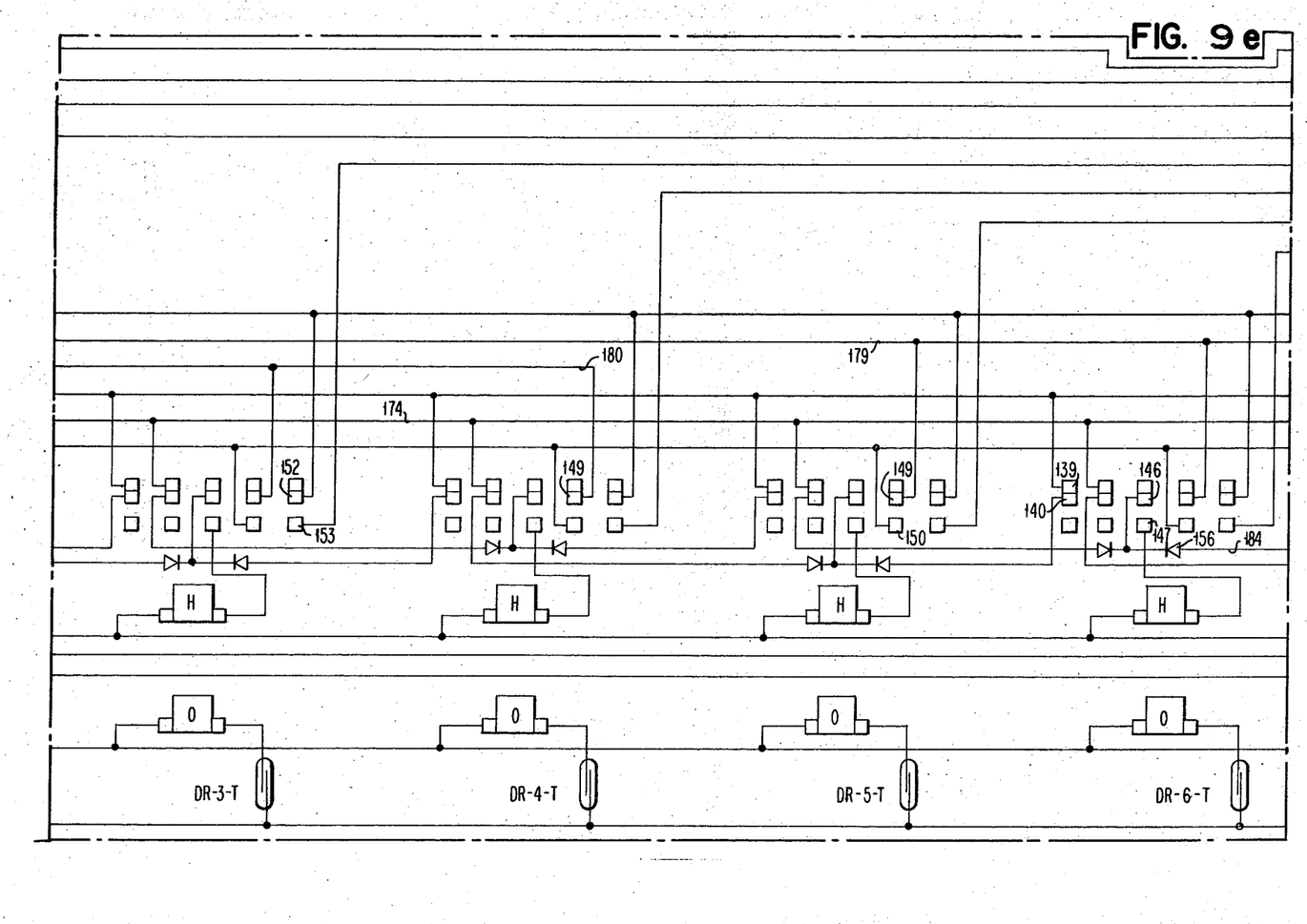
Figure 9F:
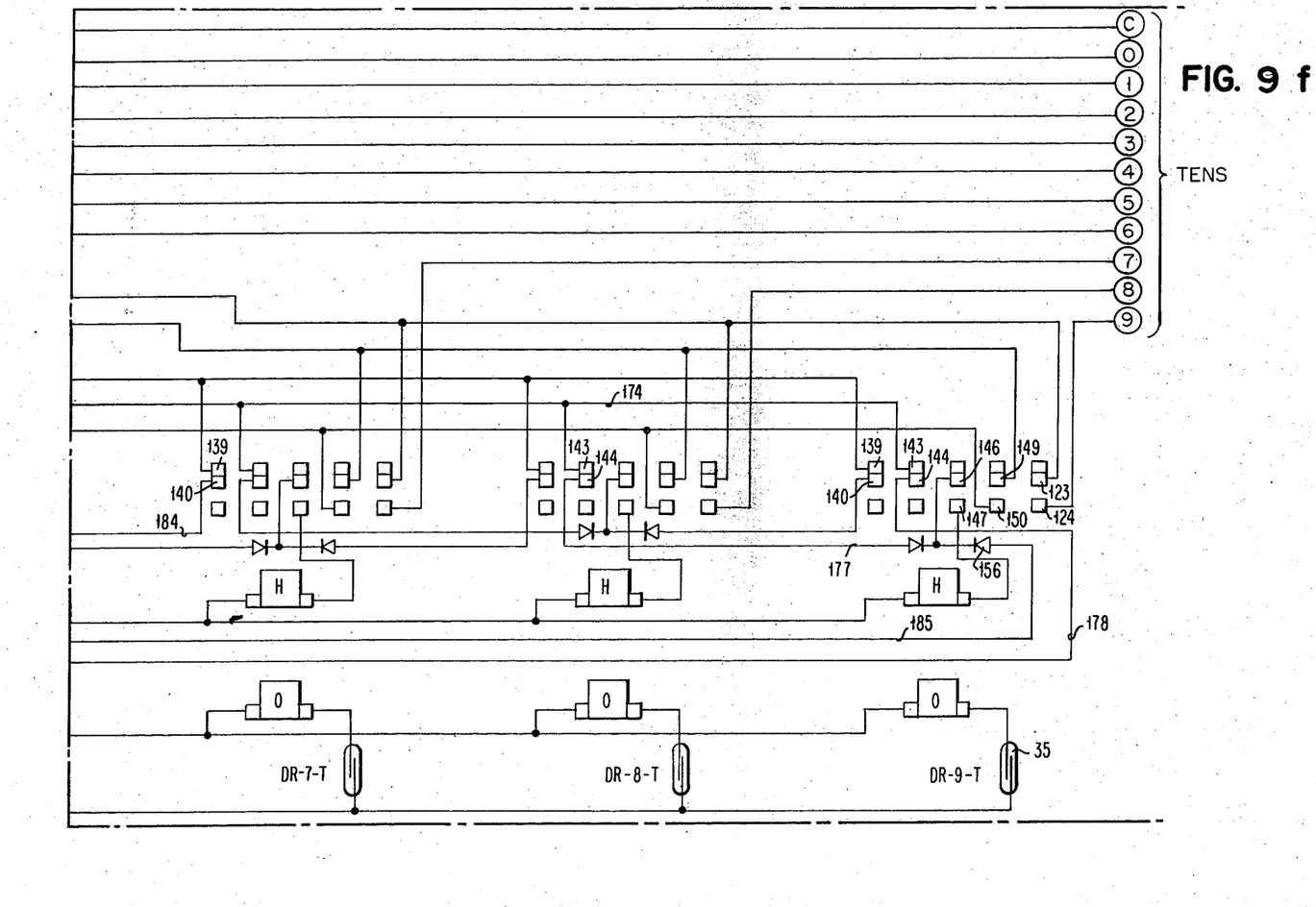
Figure 9G:
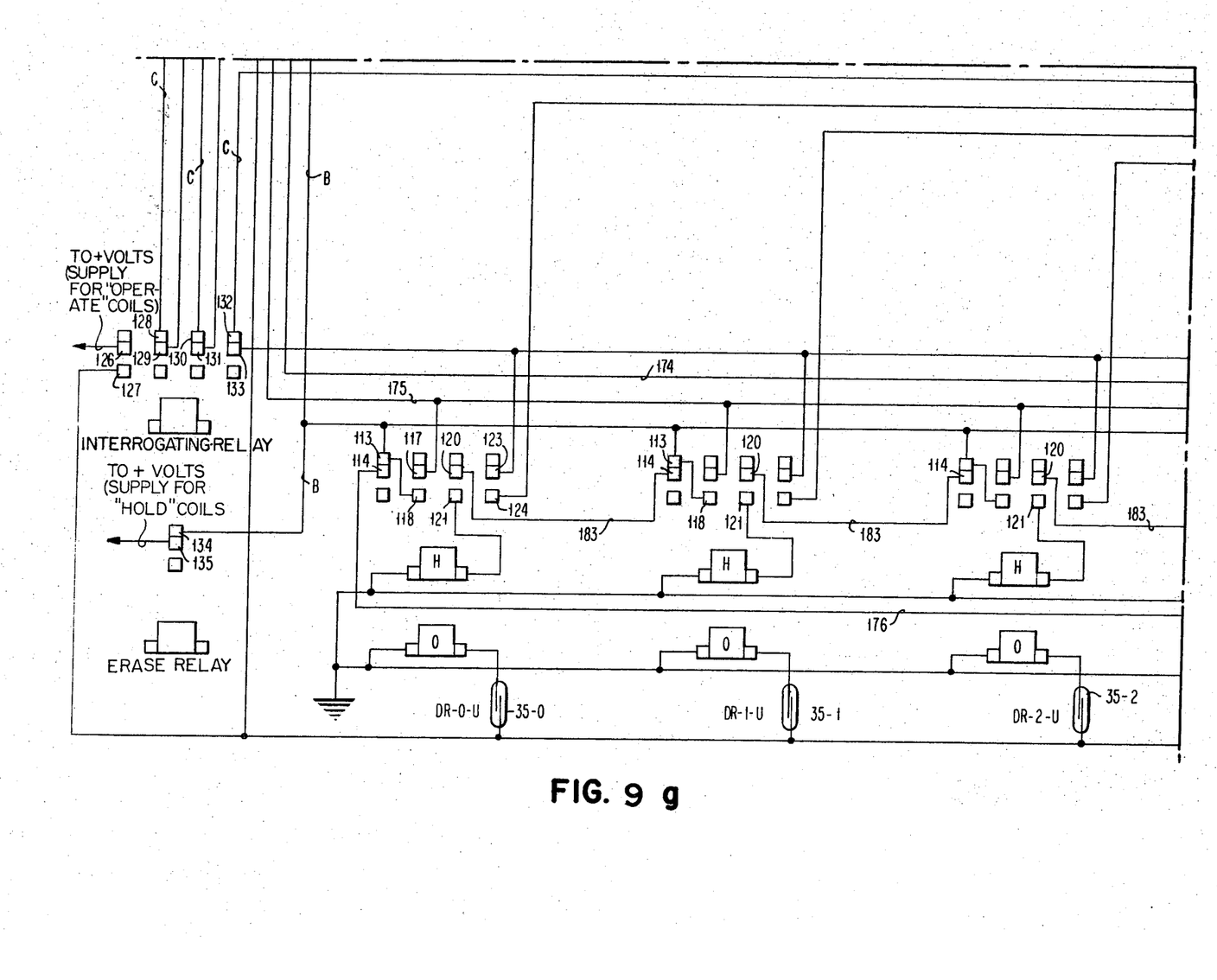
Figure 9H:
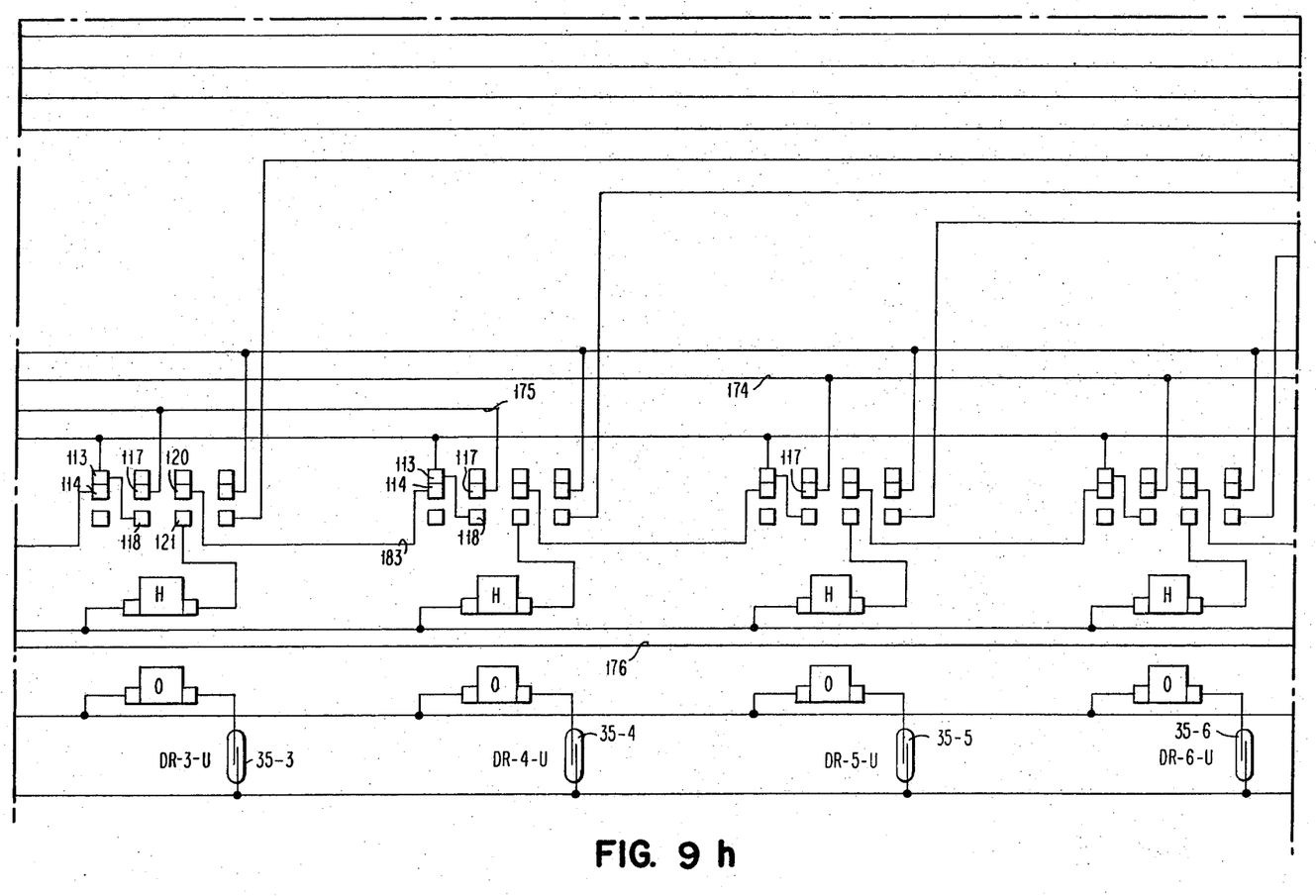
Figure 9I:
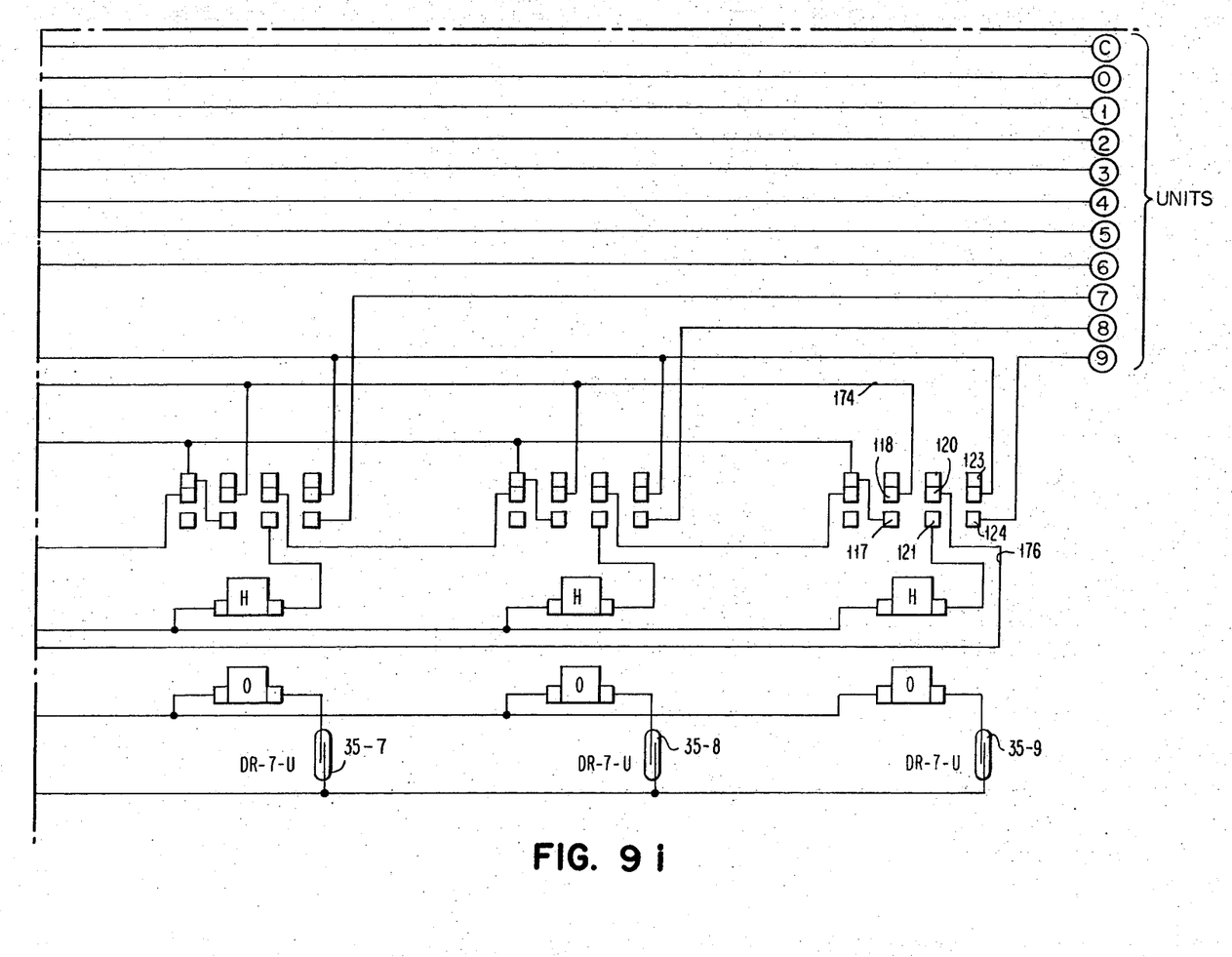

The relays in FIG. 9g, h, and i, of the drawings, represent the units and are designated as DR–O–U to DR–9–U. This is to be read as, for example, DR–3–U meaning digit relay 03–units. FIG. 9d, e, and f shows the tens and is referenced as DR–O–T to DR–9–T. FIG. 9a, b, and c shows the hundreds and is referenced as DR–O–H to DR–9–H. In the bank representing the tens, the relays are of the 5-pole type; all others are of the 4-pole type. In addition, there are two operating relays shown in FIG. 9g, namely, the erase relay and the interrogating relay both are marked accordingly. It is to be understood that suitable power supplies, not shown here, are provided for energizing the operating coils and the holding coils of the relays.

The reed switches 35, discussed in connection with the apparatus of the transducer, are drawn in and will be referenced in accordance with their position. It is seen that the operating coil of every relay connects to one terminal of a reed switch, the other terminal returning to a common conductor which terminates at the contact 127 of the interrogating relay, the corresponding rider contact 126 of which connects to the positive terminal of the power supply. The other terminal of all operating coils returns to ground which represents the negative terminal of the power supply. Consequently, when the interrogating relay is energized, all reed switches 35 are supplied with current for energizing their respective operating coils whenever the switches are closed due to the attraction of the magnets in their respective rotors 18, 28 and 29.

One terminal of the holding coils of all relays returns to ground which is the common terminal of the power supply for the holding coils. The other, shown here as the positive terminal, connects, by way of the normally closed contacts 134 and 135 of the erase relay, to the main holding circuit current bus B which is connected to the first of the upper set of contacts 113 of each of the relays DR–O–U to DR–9–U and to the fourth lower set of contacts 150 of each of the relays DR–0–T to DR–9–T of the tens decade bank. In the units decade bank the holding current supply bus B connects also to the second of the lower set of contacts 118 of each of the relays. The holding coils of the units relays connect to the third lower set of contacts 121. A cross-connection is established between the third contact of the rider 120 of one relay with the first contact of the rider 114 of the next relay throughout the bank of relays over the conductors 183. By this interconnection, it is seen that the holding circuit for any relay depends upon the position of the next higher relay in the bank. For example, if DR–1–U is actuated, the rider contact 114 opens the connection with the contact 113 which disrupts current conduction over the conductor 183 to the holding coil of DR–0–U so that if the latter was held closed, it will now open. Similarly, DR–9–U is controlled by DR–0–U in that the connection to the holding circuit current bus B between contacts 113 and 114 will be interrupted so that current over the conductor 176 connecting to the rider 120 of DR–9–U is interrupted. In other words, when DR–0–U is closed, DR–9–U will drop out. This circuit arrangement assures that at the time when the transducer is momentarily stopped for interrogation of any two adjacent relays in the units decade which are simultaneously momentarily energized, only the relay having the higher digit will remain closed. This will be explained in connection with the operation of the circuit.

The holding circuit for the tens decade is also governed by the position of the units relays. Contacts 117 of the riders of relays DR–0–U to DR–4–U connect to bus 175 which terminates at the first of the upper set of contacts 139 of the relays DR–0–T to DR–9–T. Contacts 117 of the riders DR–5–U to DR–9–U connect through bus 174 to the second of the upper set of contacts 143 of relays DR–0–T to DR–9–T. It will be seen, therefore, that holding current busses 174 and 175 carry current only when one of the relays of the units bank is closed. The main bus B of the holding current circuit power supply also connects to the fourth of the lower set of contacts 150 of the relays DR–0–T to DR–9–T.

The holding coil of relays DR–0–T to DR–9–T connects to the third of the lower set of contacts 147. In this arrangement, holding current from the rider 146 may come from two directions. Therefore, to insure proper direction of current flow, a pair of diodes 155 and 156 are interposed in the circuit so that the cathodes thereof connect to the rider 146. The cross-connection to the next relay is taken from the anode of the diode 156 to rider 140 which, when the relay is deenergized, connects through the first of the upper set of contacts 139 to the bus 175. Each rider 144 connects to the anode of the diode 155 of the next succeeding relay. It is seen, therefore, that holding current may flow either from bus 175 through the diodes 156 or from bus 174 through the diodes 155. The cross-connection between DR–0–T and DR–9–T is derived from diode 155 over conductor 178 to rider 144 of DR–9–T and from rider 140 of DR–0–T over the conductor 185 to the diode 156 associated with DR–9–T.

In the hundreds bank of relays, the connection is similar in that holding coils are connected to the third of the lower set of contacts 167; the corresponding rider contact 166 to the cathodes of diodes 172 and 173, respectively. The anode of 172 is connected over the conductor 181 to the rider 163 of relay DR–9–H, and the anode of 173 connects over the conductor 187 to the rider 160 of relay DR–1–H. Similarly, the anode of diode 173 associated with DR–1–H connects over the conductor 187 to the rider 160 of DR–2–H. These connections are repeated in the other relays of the bank. The anode of diode 172 associated with DR–1–H connects over conductor 182 to the rider 163 of DR–0–H. These connections are also repeated in the other relays of the bank.

Holding current to the hundreds bank is conducted over busses 179 and 180. Of these, 179 connects to the fourth set of contacts 149 of the riders DR–5–T to DR–9–T. From this it is seen that bus 179 carries holding current only when one or more of these last-mentioned relays are closed. Bus 180 connects to the fourth rider contact 149 of relays DR–0–T to DR–4–T. At the hundreds bank, the bus 179 connects to the second of the upper set of contacts 162 of the relays DR–0–H to DR–9–H and the bus 180 to the first set of contacts 159 of the relays DR–0–H to DR–9–H.

Aside from the function of closing the circuit from the supply source to the operating coils, the interrogating relay has the function of completing the output circuit of the relays to the common conductor. This is accomplished by the contacts 128, 130 and 132 and riders 129, 131 and 133. When these are closed, the circuit between C, or the common terminal of the outputs of the hundreds, tens, and units banks, is accomplished to the riders 123 of the units bank, 152 of the tens bank, and 169 of the hundreds bank of contacts 124, 153 and 170, respectively. The output connections may then serve as a switch to maintain a current path to either signal lights or, preferably, to the input circuit of data processing equipment.

Referring to the operation of the circuit, certain examples based on a three digit number, chosen at random, will be given to demonstrate how the proper relays are selected and held in at a time when the transducer is interrogated. It is assumed that the interrogating relay is closed by suitable energizing of the winding thereof so that current is applied to the reed switches over contacts 126 and 127. It should be noted that all the common terminals of the output circuits are open at this point.

It must be emphasized in order to clearly understand the operation that actuation of the interrogating relay is only a momentary one and is coordinated with the actuation of the brake mechanism. In practice, the total closure time of the interrogating relay is about 25 milliseconds, which is also the duration of stopping the rotation of the transducer. This small interval is sufficient to energize the operating coils of such relays which have their circuits closed by reed switches which were closed at that instant. The holding coil circuits are normally supplied with current and the selective hold and dropout of the relays are governed by the instant closure at the time of interrogation. It has been shown in practice that the extremely short duration of stopping the rotation of the transducer at the time of interrogation has generally no marked effect on the input device even if it is rigidly coupled to the input shaft. If needed, a coupling of torsional resiliency may be added.

The erase relay is not energized so that the normally closed contacts 134 and 135 supply holding current over the bus B. It should be visualized that the transducer is connected to a rotating shaft and the rotors are turning. As the bar magnet of each rotor is approaching a reed switch, circuit closure is effected to the operating coil of a particular relay associated with this switch only at the time interval of interrogation.

It should be recalled that the units rotor has four magnets so that an angular displacement of the input shaft will actuate a reed switch at every 3.6° of rotation. Similarly, the tens rotor will actuate a reed switch at every 36° of rotation, and the hundreds rotor at every 360° of rotation. As these rotors turn and the various reed switches are sequentially actuated, corresponding relays will close at the instant of interrogation and thereafter will be held selectively closed. When at any time it is desired to display in digital units the angular displacement of the input shaft, the rotation of the transducer is momentarily stopped by the brake mechanism and simultaneously the interrogating relay is momentarily deenergized. Current is thus momentarily applied and then shut off from the operating coil power supply so that no operating coil can hold a relay. Only the holding coils can have such a function. The proper relay which stays latched will have its output circuit connected over the contacts of the deenergized interrogating relay to provide a current conductive path at the output terminals.

As an example, let us take the number 099. The following reed switches would be closed when the rotors are in the proper position for the number 099: In the hundreds decade, 35–0 and 35–1; in the tens decade, 35–9 and 35–0; and in the units decade, 35–9. At the instant of interrogation, current is momentarily supplied to these reed switches. However, the correct relays for the number 099 remain closed by the holding coils, namely, DR–0–H, DR–9–T and DR–9–U. The unwanted relays drop out because their holding coils are no longer energized. When DR–9–U pulls in, it latches by closure of contacts 121 and 120 which, through conductor 176 and contacts 114 and 113 of DR–0–U complete the holding coil circuit to bus B. At the same time, closure of contacts 117 and 118 supplies current to conductor 174 to furnish holding coil power to the tens decade.

In the tens decade, DR-9-T will latch by closure of contacts 146 and 147 which, over conductor 177 and contacts 143 and 144 of DR-8-T completes the holding coil circuit to conductor 174 which carries current over the contacts 118 and 117 of DR-9-U. DR-O-T will not latch because its connection to conductor 174 over conductor 178 has been cut off by open contacts 143 and 144 of DR-9-T. Thus, in the tens decade, after the interrogating pulse, DR-9-T is the only relay which will remain closed. Meanwhile, in the hundreds decade, DR-O-H and DR-1-H are energized. DR-O-H will latch in by closure of contacts 166 and 167 which, through the diode 172, and over conductor 181 and contacts 162 and 163 of DR-9-H, complete the holding circuit to conductor 179 which carries current over closed contacts 149 and 150 of DR-9-T from the bus B. DR-1-H will not latch because its connection to conductor 179 over conductor 182 has been cut off by open contacts 162 and 163 of DR-O-H. Thus, after the interrogating pulse, only the correct relays, DR-O-H, DR-9-T, and DR-9-U will remain closed. In the output circuits, there will be a conductive connection between the common conductors and number 9 of the units decade, number 9 of the tens decade and zero in the hundreds decade. In the output circuits there will be a conductive path established between the common conductor over contacts 132—133 of the interrogating relay and contacts 123—124 of DR-9-U and, similarly, over contacts 130—131, 128—129 of the interrogating relay and contacts 123—124 of DR-9-T and DR-O-H, respectively. This connection can be utilized for actuating numerical signal lights or to supply current to a device for coding punch cards.

Let us consider now that the units rotor is rotated in the add direction from 099 position far enough to actuate the units reed switch 35 so that the number 100 would be selected. Reed switches 35-9 and 35-0 in the units decade, 35-9 and 35-0 in the tens decade, and 35-0 and 35-1 in the hundreds decade would be closed. The only difference between this and the previous pattern is the closure of switch 35-0 in the units decade. Six relays will pull in at this time. However, after the interrogating pulse, only the three desired relays will stay closed, inasmuch as the unwanted ones will be cut off from the hold coil power supply. DR-O-U will pull in and latch by closure of its contacts 120 and 121 which, over conductor 183 and contacts 113 and 114 of DR-1-U complete the hold coil circuit to bus B. DR-9-U cannot latch because its connection to the hold circuit through its contact 120 over conductor 176 has been cut off by opening of contacts 113 and 114 of DR-O-U.

Zero in the tens decade will pull in and latch by closure of its contacts 146 and 147 which, over conductor 184 and contacts 139 and 140 of DR-1-T complete the hold coil circuit to conductor 175 which has been energized by closure of contacts 117 and 118 of Dr-O-U. DR-9-T will not latch because its connection to conductor 175 over conductor 185 has been cut off by opening of contacts 139 and 140 of DR-O-T.

DR-1-H will pull in and latch by closure of its contacts 166 and 167 which derive current through diode 173 which, over conductor 187 and contacts 159 and 160 of DR-2-H, completing the hold coil circuit to conductor 180 which has been energized by closure of contacts 149 and 150 of DR-O-T. DR-O-H cannot latch because its connection to conductor 180 over conductor 187 has been cut off by opening of contacts 159 and 160 of DR-1-H.

Thus the transition of the output of the system from 099 to 100—a change of all three digits—is effected by the actuation of a single switch in the units decade.

As another example, let us take number 563. At the instant of interrogation, the probable switch closures may be as follows: Numbers 2 and 3 in the units decade; numbers 5 and 6 in the tens decade; and number 5 in the hundreds decade. In the units bank, relay DR-3-U will latch, receiving holding current from bus B through closed contacts 121 and 120 over conductors 183 and contacts 114 and 113 of DR-4-U. DR-2-U cannot latch because holding current connection is broken by opening of contact 113—114 of DR-3-U. The contact position established by the closure of DR-3-U between contacts 117 and 118 completes the circuit to bus 175 to furnish holding current to the tens decade bank. In the latter, DR-6-T will latch, receiving holding current over bus 175, contacts 139—140 of DR-7-T, conductor 184, diode 156 and contacts 146—147. DR-5-T cannot latch by virtue of the open contacts 139—140 of DR-6-T.

The actuation of DR-5-T establishes holding current power over bus 178 by virtue of the closure of its contacts 149—150 over conductor 179 for supplying the hundreds decade bank.

In the latter, DR-5-H will latch, receiving holding current in the same manner as described above in connection with the latching of DR-6-T.

To reset the system, the holding coils are deenergized by momentarily actuating the erase relay so as to open contacts 134 and 135.

To set up a new operation, it is necessary to have the rotors of the transducer so positioned that the numerical sequences of actuation start from zero in each decade. The zero position latching mechanism is now utilized for this purpose by releasing the thumb screw 58 so that the latching member 54 may be actuated by the spring 64. Turning the input shaft the member 54 will ride over the disc 56 until the proper position is reached to permit the engagement of the hook portions 61 and 62 with the cutouts 66 and 67, respectively, at which time the rotating mechanism will stop. This will insure that the rotors are in proper relation to begin the sequential switching at zero for each rotor element. The thumb screw 58 is to be reset prior to the start of operation of the transducer so that the latch member 54 will be disengaged.

While only a three digit system is shown here, it will be obvious to anyone from the above-described mode of operation and circuit design, that any number of digits may be added by repeating the decade assemblies, care being taken that proper distribution of holding circuit interconnections be maintained. As the decades are increased, certain of the relays may have to have a greater number of contact elements in order to obtain proper distribution of current to all units in the system.

The invention in its broader aspects is not limited to the specific embodiment herein shown and described but modifications may be made therefrom within the scope of the accompanying claims, without departing from the principles of the invention and without sacrificing its chief advantages.

I claim:

1. In a digital transducer for indicating the angular position and the rotational displacement of a rotating member, an input shaft adapted to be coupled to said rotating member, a rotor driven by said shaft, said rotor having a magnetomotive actuating element, a stator surrounding said rotor, said stator having a plurality of ferromagnetic devices distributed at equidistant points and adapted to be actuated by said magnetomotive element, a gear train coupled to said shaft, a plurality of disc-shaped rotors driven by said train each having at least one magnetomotive actuating element and a stator carrying equidistantly distributed ferromagnetic contact devices adapted to be sequentially actuated by the actuating elements of corresponding rotors, said magnetomotive elements comprising magnets disposed at the periphery of said discs, one set of said magnets on one of said discs being disposed with their pole pieces arranged in one order of polarity and others of said magnets being disposed adjacent said first set of magnets with their pole pieces arranged in opposite polarity.

2. A digital transducer in accordance with claim 1 wherein said rotors comprise a shaft carrying a disc of insulating material and said magnetomotive elements comprise bar magnets disposed at the periphery of said discs, said stators comprising a frame and said ferromagnetic contact devices comprise a plurality of reed switches disposed in said frame parallel to said rotor shaft around the periphery of said disc, certain of said magnets being arranged in one order of polarity and producing lines of force for effecting contact closure in said reed switches and the other of said magnets being arranged in opposite polarity for effecting depolarization of said reed switches.

3. A digital transducer in accordance with claim 1 wherein said gear train comprises a drive member attached to said shaft and two driven members each having a rotor and an idler member driving an electrically operated friction brake for stopping the rotation of said gear train upon interrogation of said transducer.

4. A digital transducer in accordance with claim 1 wherein locating means are provided for automatically establishing the starting position of said transducer.

5. A digital transducer in accordance with claim 1 wherein said gear train comprises a drive member and a driven member, a disc carried by each of said members, a notch in each of said discs and a clamp adapted to engage said notches in one position of relative displacement of said members, said position determining the zero starting position of said transducer and means for displacing said clamp from engagement with said notches.

6. In a system for indicating at desired intervals in digital representation the angular position of a rotating member within a predetermined limit of total rotational displacement thereof, a plurality of rotary switching means coupled to said member and sequentially and repeatedly actuated into closing and opening positions at preselected rates during rotation of said member, said switch carrying no electrical current while in motion, brake means for momentarily stopping the rotation of said switching means, at least one electrical circuit connected to said switching means including a plurality of relays each adapted to actuate a digital display element, a power supply for energizing said circuit, a normally open switch between said power supply and said circuit and closure means interconnected with said brake means for closing said switch upon momentary stopping of the rotation of said rotary switching means, whereby current from said power supply is permitted to flow through the respective closed contacts of said rotary switching means for the actuation of certain of said relays and the digital display elements connected therewith.